(12) United States Patent
Hoshiba

(10) Patent No.: US 11,021,019 B2
(45) Date of Patent: Jun. 1, 2021

(54) PNEUMATIC TIRE

(71) Applicant: The Yokohama Rubber Co., LTD., Tokyo (JP)

(72) Inventor: Takashi Hoshiba, Hiratsuka (JP)

(73) Assignee: The Yokohama Rubber Co., LTD.

(*) Notice: Subject to any disclaimer, the term of this patent is extended or adjusted under 35 U.S.C. 154(b) by 858 days.

(21) Appl. No.: 15/552,756

(22) PCT Filed: Mar. 2, 2016

(86) PCT No.: PCT/JP2016/056501
§ 371 (c)(1),
(2) Date: Aug. 22, 2017

(87) PCT Pub. No.: WO2016/143642
PCT Pub. Date: Sep. 15, 2016

(65) Prior Publication Data
US 2018/0065417 A1   Mar. 8, 2018

(30) Foreign Application Priority Data
Mar. 10, 2015  (JP) .............................. JP2015-047571

(51) Int. Cl.
*B60C 11/01*   (2006.01)
*B60C 11/03*   (2006.01)
(Continued)

(52) U.S. Cl.
CPC .............. *B60C 11/13* (2013.01); *B60C 11/01* (2013.01); *B60C 11/03* (2013.01);
(Continued)

(58) Field of Classification Search
CPC ............. B60C 11/0306; B60C 11/1236; B60C 2011/1254; B60C 11/1369
(Continued)

(56) References Cited

U.S. PATENT DOCUMENTS

D452,666 S  *  1/2002  Regallis ...................... D12/601
D484,457 S  * 12/2003  Kindig ......................... D12/603
(Continued)

FOREIGN PATENT DOCUMENTS

JP        62004608 A  *  1/1987
JP        06183214 A  *  7/1994
(Continued)

OTHER PUBLICATIONS

Machine Translation: JP-2012006541-A; Hirose, Katsumi; (Year: 2020).*

(Continued)

*Primary Examiner* — Kendra Ly
(74) *Attorney, Agent, or Firm* — Thorpe North & Western

(57) ABSTRACT

A pneumatic tire comprises a first main groove disposed in a tread surface on either side of a tire equatorial plane, the first main grooves extending in a tire circumferential direction; a second main groove disposed outward of each of the first main grooves in a tire width direction, the second main groove extending in the tire circumferential direction; five land portions defined by the four main grooves, the five land portions including a center land portion located between the first main grooves, two intermediate land portions located between the first main grooves and the second main grooves, and two shoulder land portions located outward of the second main grooves in the tire width direction; and sub grooves and sipes disposed in each of the land portions.

19 Claims, 9 Drawing Sheets

(51) Int. Cl.
  *B60C 11/117* (2006.01)
  *B60C 11/12* (2006.01)
  *B60C 11/13* (2006.01)

(52) U.S. Cl.
  CPC .......... *B60C 11/0306* (2013.01); *B60C 11/12* (2013.01); *B60C 11/1263* (2013.01); *B60C 2011/0346* (2013.01); *B60C 2011/0348* (2013.01); *B60C 2011/0365* (2013.01); *B60C 2011/0369* (2013.01); *B60C 2011/1209* (2013.01)

(58) Field of Classification Search
  USPC .................................................. D12/500–608
  See application file for complete search history.

(56) References Cited

U.S. PATENT DOCUMENTS

| | | | | |
|---|---|---|---|---|
| D490,365 S | * | 5/2004 | Kindig | D12/601 |
| D515,020 S | * | 2/2006 | Fukunaga | D12/521 |
| D586,733 S | * | 2/2009 | Shinohara | D12/588 |
| D624,488 S | * | 9/2010 | Nakamura | D12/588 |
| D669,421 S | * | 10/2012 | Stuckey | D12/588 |
| D764,390 S | * | 8/2016 | Umstot | D12/588 |
| 2010/0186861 A1 | * | 7/2010 | Ishiguro | B60C 11/033 152/209.25 |
| 2012/0118455 A1 | * | 5/2012 | Hada | B60C 11/0304 152/209.8 |
| 2012/0145295 A1 | * | 6/2012 | Yamada | B60C 11/12 152/209.22 |
| 2012/0160385 A1 | * | 6/2012 | Tanaka | B60C 11/1369 152/209.22 |
| 2012/0227881 A1 | * | 9/2012 | Kudo | B60C 11/1259 152/209.14 |
| 2016/0089938 A1 | * | 3/2016 | Iwasaki | B60C 11/1236 152/209.18 |

FOREIGN PATENT DOCUMENTS

| | | | |
|---|---|---|---|
| JP | H07-186626 | | 7/1995 |
| JP | 2008037139 A | * | 2/2008 |
| JP | 2010-168006 | | 8/2010 |
| JP | 2010-247711 | | 11/2010 |
| JP | 2012006541 A | * | 1/2012 |
| JP | 2013-151235 | | 8/2013 |
| JP | 2013154654 A | * | 8/2013 |
| JP | 2014-148221 | | 8/2014 |
| JP | 2014151748 A | * | 8/2014 |

OTHER PUBLICATIONS

Machine Translation: JP-2014151748-A; Takei Goku; (Year: 2020).*
Machine Translation: JP-06183214-A; Sugitani, Kenichiro; (Year: 2020).*
Machine Translation: JP-2008037139-A; Nakamura, Tomohiko; (Year: 2020).*
Machine Translation: JP-62004608-A; Mama, Riichiro; (Year: 2020).*
Machine Translation: JP-2013154654-A; Ishizaka, Takahide; (Year: 2020).*
International Search Report for International Application No. PCT/JP2016/056501 dated May 31, 2016, 4 pages, Japan.

* cited by examiner

| | CONVENTIONAL EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|
| GROOVE AREA RATIO TO SUB GROOVES AND SIPES SHOULDER LAND PORTIONS/CENTER LAND PORTION | 1 | 1.1 | 2.0 | 1.5 | 1.5 | 1.5 | 1.5 | 1.5 | 1.5 |
| GROOVE AREA RATIO TO SUB GROOVES AND SIPES SHOULDER LAND PORTIONS/INTERMEDIATE LAND PORTIONS | 0.8 | 1.1 | 2.0 | 1.5 | 1.5 | 1.5 | 1.5 | 1.5 | 1.5 |
| THIRD SUB GROOVES AND FIFTH SUB GROOVES ALIGNED | YES | NO | NO | NO | NO | NO | NO | NO | NO |
| SIXTH SIPES | NO | YES | YES | YES | YES | YES | YES | YES | YES |
| CIRCUMFERENTIAL NARROW GROOVE | NO | NO | NO | NO | YES | YES | YES | YES | YES |
| GROOVE AREA RATIO TO SUB GROOVES SHOULDER LAND PORTIONS/CENTER LAND PORTION | 1 | 1.1 | 2.0 | 1.5 | 1.5 | 1.5 | 1.5 | 1.5 | 1.5 |
| GROOVE AREA RATIO TO SUB GROOVES SHOULDER LAND PORTIONS/INTERMEDIATE LAND PORTIONS | 0.8 | 1.1 | 2.0 | 1.5 | 1.5 | 1.5 | 1.5 | 1.5 | 1.5 |
| POSITION OF FIRST MAIN GROOVES FROM TIRE EQUATORIAL PLANE WITH RESPECT TO THE GROUND CONTACT WIDTH | 0.30 | 0.30 | 0.30 | 0.30 | 0.30 | 0.05 | 0.25 | 0.10 | 0.10 |
| POSITION OF SECOND MAIN GROOVES FROM TIRE EQUATORIAL PLANE WITH RESPECT TO THE GROUND CONTACT WIDTH | 0.70 | 0.70 | 0.70 | 0.70 | 0.70 | 0.40 | 0.65 | 0.50 | 0.50 |
| RAISED BOTTOM PORTION OF FIRST SUB GROOVE AT INNER END PORTION | NO | NO | NO | NO | NO | NO | NO | YES | YES |
| RAISED BOTTOM PORTION OF SECOND SUB GROOVE AT INNER END PORTION | NO | NO | NO | NO | NO | NO | NO | YES | YES |
| RAISED BOTTOM PORTION OF FIRST SUB GROOVE TO FIRST MAIN GROOVE | NO | NO | NO | NO | NO | NO | NO | YES | YES |
| RAISED BOTTOM PORTION OF FIRST SUB GROOVE TO SECOND MAIN GROOVE | NO | NO | NO | NO | NO | NO | NO | YES | YES |
| RAISED BOTTOM PORTION OF THIRD SUB GROOVE AT INNER END PORTION | NO | NO | NO | NO | NO | NO | NO | YES | YES |
| RAISED BOTTOM PORTION OF FOURTH SUB GROOVE AT INNER END PORTION | NO | NO | NO | NO | NO | NO | NO | YES | YES |
| RAISED BOTTOM PORTION OF THIRD SUB GROOVE TO FIRST MAIN GROOVE AND RAISED BOTTOM PORTION TO SECOND MAIN GROOVE | NO | NO | NO | NO | NO | NO | NO | YES | YES |
| INNER SUB GROOVE PORTION AND OUTER SUB GROOVE PORTION OF THIRD SUB GROOVE | NO | NO | NO | NO | NO | NO | NO | NO | YES |
| RAISED BOTTOM PORTION OF FIFTH SUB GROOVE INWARD OF CIRCUMFERENTIAL NARROW GROOVE IN TIRE WIDTH DIRECTION | NO | NO | NO | NO | NO | NO | NO | YES | YES |
| PERFORMANCE ON SNOW | 100 | 103 | 103 | 105 | 107 | 110 | 110 | 110 | 110 |
| STEERING STABILITY PERFORMANCE ON DRY ROAD SURFACE | 100 | 100 | 100 | 100 | 100 | 103 | 103 | 105 | 107 |

FIG. 16

PNEUMATIC TIRE

TECHNICAL FIELD

The present technology relates to a pneumatic tire with improved performance on snow (driving and braking performance) and steering stability performance on dry road surfaces.

BACKGROUND ART

In the art, the pneumatic tire described in Japanese Unexamined Patent Application Publication No. 2010-168006A designed to enhance dry performance while maintaining snow performance is known, for example. This pneumatic tire includes two first main grooves that extend in the circumferential direction of the tire disposed on either side of a tire equatorial plane in the tread surface; two second main grooves that extend in the tire circumferential direction disposed outward of the first main grooves; and five land portions defined by the four main grooves. The five land portions include a center land portion located between the first main grooves, two middle land portions located between the first main grooves and the second main grooves, and two shoulder land portions located outward of the second main grooves in the tire width direction. Furthermore, sub grooves and sipes are formed in each of the land portions. A combined groove area ratio of the sub grooves and the sipes in each of the land portions is different in the center land portion and the shoulder land portions as compared to the intermediate land portions, with the groove area ratio of the center land portions and the shoulder land portions being lower and the groove area ratio of the intermediate land portions being higher.

The pneumatic tire described in Japanese Unexamined Patent Application Publication No. 2010-168006A has enhanced steering stability performance on dry road surfaces while maintaining performance on snow (driving and braking performance) at the same levels as conventional pneumatic tires. However, there is a demand for a further increase in performance on snow (driving and braking performance).

SUMMARY

The present technology provides a pneumatic tire with further improved performance on snow while maintaining steering stability performance on dry road surfaces.

A pneumatic tire comprises:

a first main groove disposed in a tread surface on either side of a tire equatorial plane, the first main grooves extending in a tire circumferential direction;

a second main groove disposed outward of each of the first main grooves in a tire width direction, the second main groove extending in the tire circumferential direction;

five land portions defined by the four main grooves, the five land portions including a center land portion located between the first main grooves, two intermediate land portions located between the first main grooves and the second main grooves, and two shoulder land portions located outward of the second main grooves in the tire width direction; and sub grooves and sipes disposed in each of the land portions;

the land portions having different groove area ratios to the sub grooves and the sipes, with the shoulder land portions having a higher groove area ratio than the center land portion and the intermediate land portions;

the sub grooves disposed in the center land portion including first sub grooves extending in the tire width direction from one of the first main grooves to a partway portion of the center land portion, and second sub grooves extending in the tire width direction from the other first main groove to the partway portion of the center land portion, the first sub grooves and the second sub grooves being alternately disposed in the tire circumferential direction at predetermined intervals, the center land portion being formed as a rib, and the sipes disposed in the center land portion including first sipes extending in the tire width direction from an inner end of the first sub groove to the other first main groove, and second sipes extending in the tire width direction from an inner end of the second sub groove to the one of the first main grooves;

the sub grooves disposed in the intermediate land portions including third sub grooves extending in the tire width direction from the first main groove to the second main groove, and fourth sub grooves extending in the tire width direction from the second main groove to a partway portion of the intermediate land portion, the third sub grooves being disposed in the tire circumferential direction at predetermined intervals, and the intermediate land portions being defined into blocks by the first main groove, the second main groove, and the third sub grooves, and the blocks each being provided with one of the fourth sub grooves, and the sipes disposed in the intermediate land portions including third sipes extending in the tire width direction from an inner end of the fourth sub groove to the first main groove, and a fourth sipe that crosses the blocks in the tire circumferential direction;

the sub grooves disposed in the shoulder land portions including fifth sub grooves extending outward in the tire width direction from the second main groove beyond a ground contact edge, the fifth sub grooves being disposed so that an end portion thereof proximal to the second main groove does not align with an end portion of the third sub groove of the intermediate land portion proximal to the second main groove, and sixth sub grooves extending outward in the tire width direction from a partway portion of the shoulder land portion beyond the ground contact edge, and the fifth sub grooves being disposed in the tire circumferential direction at predetermined intervals, and the shoulder land portions being defined into blocks by the second main groove and the fifth sub grooves, and the blocks each being provided with one of the sixth sub grooves, and the sipes disposed in the shoulder land portions including fifth sipes extending in the tire width direction from the second main groove to the sixth sub groove and sixth sipes extending in the tire width direction between the fifth sub groove and the sixth sub groove and the fifth sipe to beyond the ground contact edge.

According to the pneumatic tire, by the groove area ratio of the shoulder land portions being greater than the groove area ratio of the center land portion and the intermediate land portions, edge components are increased. As a result, performance on snow (driving and braking performance) can be increased. The center land portion, which has an effect on the steering stability performance when driving straight on dry road surfaces, has a relatively low groove area ratio, allowing the steering stability performance when driving straight on dry road surfaces to be improved. Additionally, the shoulder land portions have an effect on the steering stability when cornering on dry road surfaces. Thus, by disposing the sub grooves so that the end portions of the sub grooves do not align with the end portions of the sub grooves of the intermediate land portions, the rigidity in the regions near the second main grooves of the shoulder land portions and the intermediate land portions is improved. As a result, a decrease in the steering stability when cornering on dry road surfaces can be suppressed. As a result, performance on snow can be further improved while maintaining the steering stability performance on dry road surfaces.

In another embodiment of the pneumatic tire of the present technology, the shoulder land portions include a circumferential narrow groove extending in the tire circumferential direction that intersects the fifth sub grooves, and the sixth sipes are disposed outward of the circumferential narrow groove in the tire width direction without meeting the circumferential narrow groove.

According to this pneumatic tire, the circumferential narrow grooves improve the traction in the tire width direction when steering. As a result, the feedback when steering on snow-covered road surfaces is excellent and steering stability performance can be improved. By the circumferential narrow grooves not meeting the sixth sipes, the rigidity of the shoulder land portions is ensured. As a result, a decrease in the steering stability performance on dry road surfaces can be suppressed.

In another embodiment of the pneumatic tire of the present technology, the groove area ratio of the land portions to the sub grooves are such that the groove area ratio is higher in the shoulder land portions than in the center land portion and the intermediate land portions.

According to such a pneumatic tire, the groove area ratio of the sub grooves is higher in the shoulder land portions than in the center land portion and the intermediate land portions. This allows the edge components to be increased beyond just those of the sipes and performance on snow (driving and braking performance) to be improved.

In another embodiment of the pneumatic tire of the present technology, the groove area ratio A of the center land portion to the sub grooves, the groove area ratio B of the intermediate land portions to the sub grooves, and the groove area ratio C of the shoulder land portions to the sub groove have the relationships: $1.1A \leq C \leq 2.0A$ and $1.1B \leq C \leq 2.0B$.

If the groove area ratio C of the sub grooves in the shoulder land portions is less than 1.1A with respect to the groove area ratio A of the sub grooves in the center land portion and less than 1.1B with respect to the groove area ratio B of the sub grooves in the intermediate land portions, the increase in edge components in the shoulder land portions is minimal and performance on snow is not effectively improved. If the groove area ratio C of the sub grooves in the shoulder land portions is greater than 2.0A with respect to the groove area ratio A of the sub grooves in the center land portion and greater than 2.0B with respect to the groove area ratio B of the sub grooves in the intermediate land portions, the rigidity in the shoulder land portions is likely to decrease and the steering stability performance on dry road surfaces decreases significantly. Accordingly, the groove area ratios preferably have the relationships: $1.1A \leq C \leq 2.0A$ and $1.1B \leq C \leq 2.0B$.

In another embodiment of the pneumatic tire of the present technology, the first main grooves are at least partially disposed within a range of from 0.05 D to 0.25 D outward from a tire equatorial plane in the tire width direction, and the second main grooves are at least partially disposed within a range of from 0.40 D to 0.65 D outward from the tire equatorial plane in the tire width direction, D being a ground contact width.

If the first main grooves are located inward of the location of 0.05 D in the tire width direction, the width of the center land portion is excessively narrow and the lateral rigidity decreases. As a result, the steering stability performance on dry road surfaces is likely to decrease. If the first main grooves are located outward of the location of 0.25 D in the tire width direction, the intermediate land portions are partially shifted outside of the positions that have a great effect on performance on snow. This is not preferable from the perspective of performance on snow. If the second main grooves are located outward of the location of 0.65 D in the tire width direction, the width of the shoulder land portions is excessively narrow and the lateral rigidity decreases. As a result, the steering stability performance on dry road surfaces is likely to decrease. If the second main grooves are located inward of the location of 0.40 D in the tire width direction, the intermediate land portions are partially shifted inside of the positions that have a great effect on performance on snow. This is not preferable from the perspective of performance on snow. Accordingly, the first main grooves and the second main grooves are preferably disposed as described above.

In another embodiment of the pneumatic tire of the present technology, the first sub grooves and the second sub grooves are provided with a raised bottom portion on a groove bottom at an inner end portion.

According to the pneumatic tire, the raised bottom portions provided on the groove bottoms at the inner end portions of the first sub grooves and the second sub grooves connect the land portions on either side of the sub grooves, and the raised bottom portions increase the rigidity of the center land portion in the center region in the tire width direction. Thus, the effect of suppressing a decrease in the steering stability performance on dry road surfaces can be significantly obtained.

In another embodiment of the pneumatic tire of the present technology, the first sub grooves and the second sub grooves are provided with a raised bottom portion on a groove bottom extending to the first main groove.

According to the pneumatic tire, the raised bottom portions of the first sub grooves and the second sub grooves increase the rigidity of the center land portion in the outer region in the tire width direction. Thus, the effect of suppressing a decrease in the steering stability performance on dry road surfaces can be significantly obtained.

In another embodiment of the pneumatic tire of the present technology, the third sub grooves are provided with a raised bottom portion on a groove bottom at an end portion proximal to the first main groove, and the fourth sub grooves are provided with a raised bottom portion on a groove bottom at an inner end portion.

According to the pneumatic tire, the raised bottom portions provided in the third sub grooves at the end portions proximal to the first main groove increase the rigidity of the intermediate land portions in the inner region in the tire width direction. Additionally, the raised bottom portions provided in the fourth sub grooves on the groove bottoms at the inner end portions increase rigidity in the intermediate land portions in the center regions in the tire width direction. As a result, the effect of suppressing a decrease in the steering stability performance on dry road surfaces can be significantly obtained.

In another embodiment of the pneumatic tire of the present technology, the third sub groove is provided with a raised bottom portion on a groove bottom extending to the first main groove and a raised bottom portion extending to the second main groove.

According to the pneumatic tire, the raised bottom portions increase the rigidity of the intermediate land portions on both sides in the tire width direction. Thus, the effect of suppressing a decrease in the steering stability performance on dry road surfaces can be significantly obtained.

In another embodiment of the pneumatic tire of the present technology, the third sub grooves include an inner sub groove portion extending from the first main groove to the partway portion of the intermediate land portion and an outer sub groove portion that communicates with the inner sub groove portion and extends from the partway portion of the intermediate land portion to the second main groove, and the outer sub groove portion has a smaller groove width than the inner sub groove portion.

According to the pneumatic tire, by the groove width of the outer sub groove portion proximal to the second main groove being less than the groove width of the inner sub groove portion, the rigidity of the intermediate land portion in the outer region in the tire width direction is increased. Thus, the effect of suppressing a decrease in the steering stability performance on dry road surfaces can be significantly obtained.

In another embodiment of the pneumatic tire of the present technology, the shoulder land portions are provided with a circumferential narrow groove that extends in the tire circumferential direction and intersects the fifth sub grooves, and the fifth sub grooves are provided with a raised bottom portion on a groove bottom inward of the circumferential narrow groove in the tire width direction.

According to the pneumatic tire, the raised bottom portions increase the rigidity of the shoulder land portions in the inner region in the tire width direction from the circumferential narrow groove. Thus, the effect of suppressing a decrease in the steering stability performance on dry road surfaces can be significantly obtained. Additionally, the raised bottom portions prevent noise from escaping from the second main grooves outward in the tire width direction of the circumferential narrow groove. As a result, external noise can be suppressed.

The pneumatic tire according to an embodiment of the present technology can have further improved performance on snow while maintaining the steering stability performance on dry road surfaces.

BRIEF DESCRIPTION OF DRAWINGS

FIG. 16 is a table showing results of performance testing of pneumatic tires according to examples of the present technology.

DETAILED DESCRIPTION

Embodiments of the present technology are described in detail below with reference to the drawings. However, the present technology is not limited by the embodiments. Constituents of the embodiments include elements that can be easily replaced by those skilled in the art and elements substantially the same as the constituents of the embodiments. Furthermore, the modified examples described in the embodiments can be combined as desired within the scope apparent to those skilled in the art.

Figure 1:
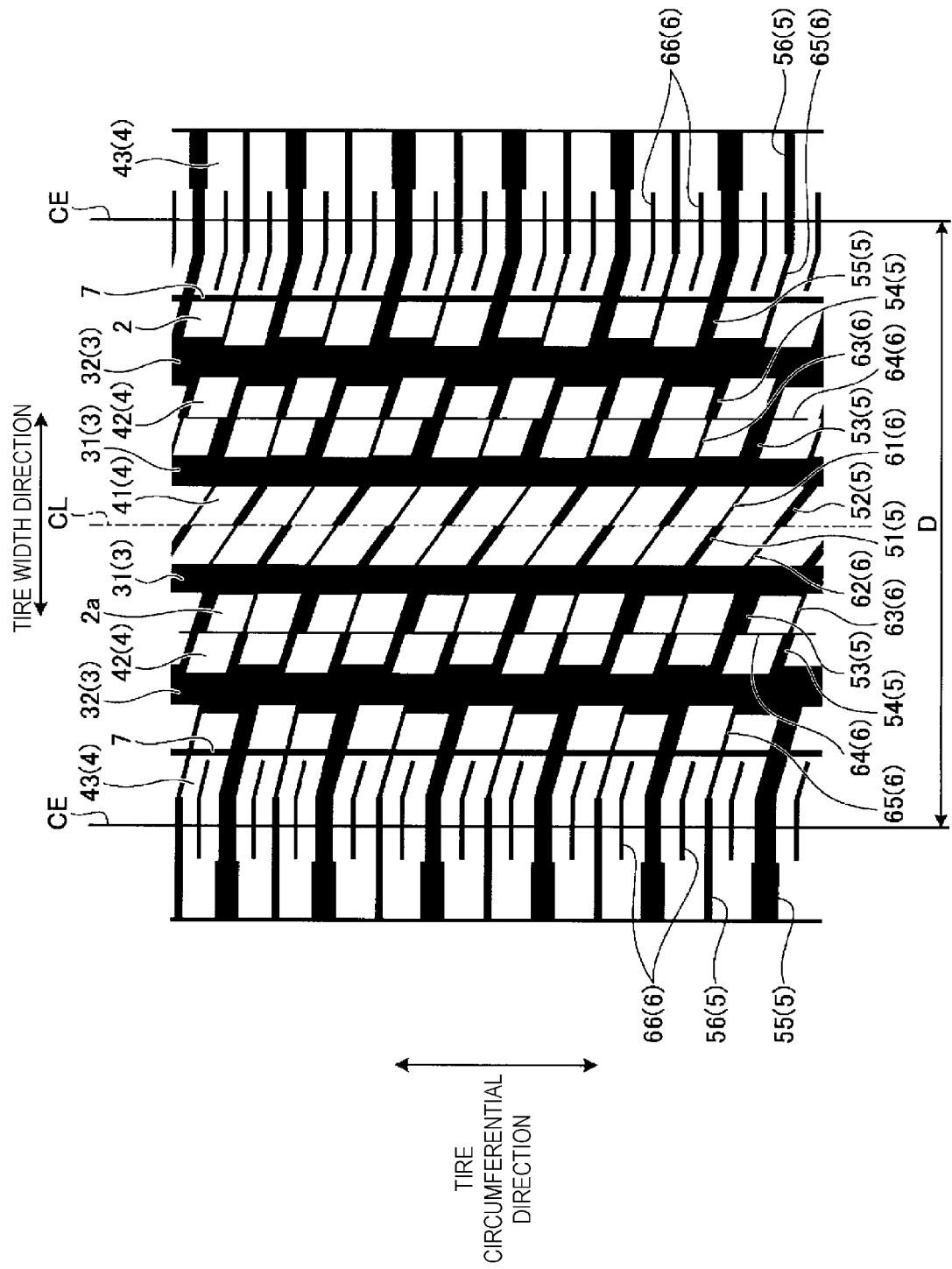
FIG. 1 is a plan view of a pneumatic tire according to an embodiment of the technology.
Figure 2:
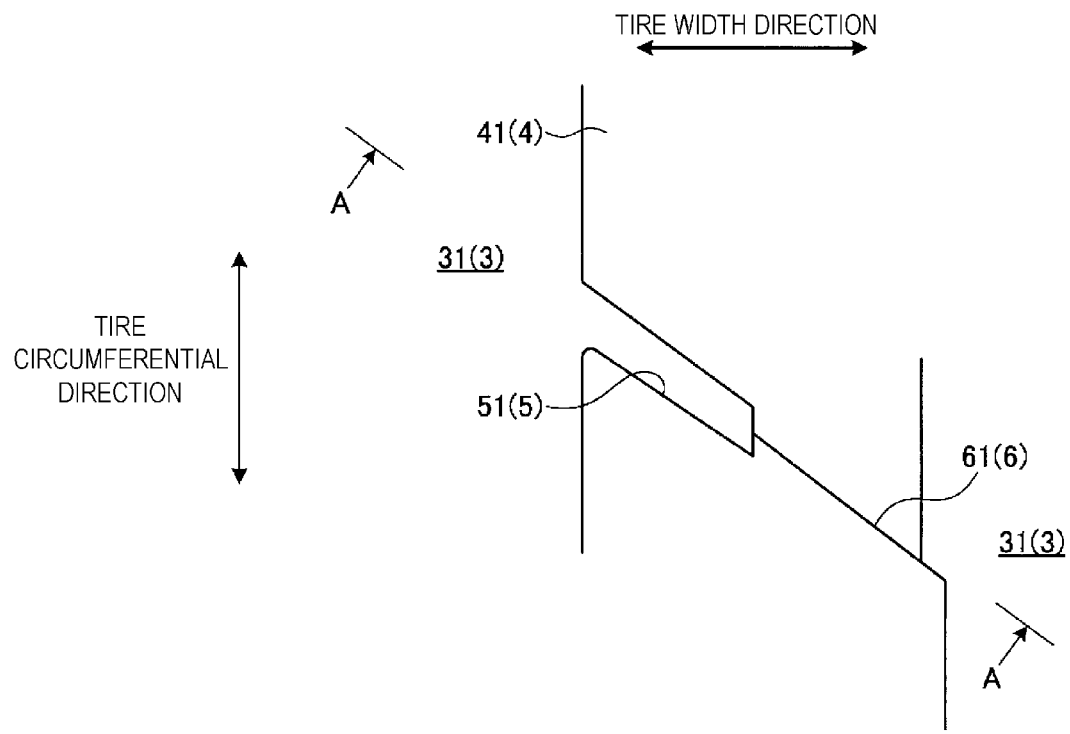
FIG. 2 is an enlarged plan view of a portion of the pneumatic tire according the embodiment of the present technology.

FIG. 1 is a plan view of a pneumatic tire according to the present embodiment. FIG. 2 is an enlarged plan view of a portion of the pneumatic tire according to the present embodiment.

In the following description, "tire circumferential direction" refers to the circumferential direction with the rotational axis of the pneumatic tire 1 (not illustrated) as the center axis. "Tire width direction" refers to the direction parallel with the rotation axis. "Inward in the tire width direction" refers to the direction toward a tire equatorial plane (tire equator line) CL in the tire width direction, and "outward in the tire width direction" refers to the direction away from the tire equatorial plane CL in the tire width direction. Furthermore, "tire radial direction" refers to the direction orthogonal to the rotation axis. "Inward in the tire radial direction" refers to the direction toward the rotation axis in the tire radial direction. "Outward in the tire radial direction" refers to the direction away from the rotation axis in the tire radial direction. Additionally, "tire equatorial plane" refers to the plane orthogonal to the rotation axis that passes through the center of the tire width of the pneumatic tire 1. "Tire equator line" refers to the line in the circumferential direction of the pneumatic tire 1 that lies on the tire equatorial plane CL. In the present embodiment, the tire equator line and the tire equatorial plane are both denoted by reference sign CL.

The pneumatic tire 1 of the present embodiment includes a tread portion 2, as illustrated in FIG. 1. The tread portion 2 is made of a rubber material, and is exposed at an outermost side of the pneumatic tire 1 in the tire radial direction. The surface of the tread portion 2 is defined as a tread surface 2a that serves as a profile of the pneumatic tire 1.

The tread portion 2 includes four main grooves 3 extending in the tire circumferential direction. The main grooves 3 are disposed side by side in the tire width direction in the tread surface 2a. The main grooves 3 include two first main grooves 31 disposed on either side of the tire equatorial plane and two second main grooves 32 disposed outward of the first main grooves 31 in the tire width direction. Note that in the present embodiment, the main grooves 3 have a groove width of from 3 mm to 20 mm and a groove depth (dimension from the opening position of the tread surface 2a to the groove bottom) of from 5 mm to 13 mm.

The tread surface 2a of the tread portion 2 is divided in the tire width direction into five land portions 4 by the main grooves 3. The five land portions 4 include a center land portion 41 located between the first main grooves 31, two intermediate land portions 42 located between the first main grooves 31 and the second main grooves 32, and two shoulder land portions 43 located outward of the second main grooves 32 in the tire width direction. The land portions 4 each include a sub groove 5 and a sipe 6. Note that in the present embodiment, the sub groove 5 is defined as a groove excluding the main groove 3 with a groove width greater than 1.5 mm and groove depth at the deepest groove bottom less than that of the main grooves 3. Additionally, in the present embodiment, the sipe 6 is defined as a cut with a groove width of from 0.5 mm to 1.5 mm and a groove depth at the deepest groove bottom less than that of the sub groove 5.

The sub grooves 5 in the center land portion 41 include a first sub groove 51 and a second sub groove 52. The first sub groove 51 extends from one of the first main grooves 31 (on the left side in FIG. 1) inward in the tire width direction at an incline to one side (down in FIG. 1) with respect to the tire circumferential direction and terminates at a partway portion of the center land portion 41 (a position on the tire equatorial plane CL in the present embodiment). The second sub groove 51 extends from the other first main groove 31 (on the right side in FIG. 1) inward in the tire width direction at an incline to the other side (up in FIG. 1) with respect to the tire circumferential direction and terminates at the partway portion of the center land portion 41 (a position on the tire equatorial plane CL in the present embodiment). The first sub groove 51 and the second sub groove 52 have the same inclination direction with respect to the tire circumferential direction and are alternately disposed in the tire circumferential direction at predetermined intervals. The center land portion 41 includes the first sub grooves 51 and the second sub grooves 52 that extend to the partway portion and is formed as a rib continuous in the tire circumferential direction. The rigidity in the tire circumferential direction of the center land portion 41 is increased by alternately disposed first sub grooves 51 and second sub grooves 52 that extend to the partway portion of the center land portion 41.

The sipes 6 in the center land portion 41 include a first sipe 61 and a second sipe 62. The first sipe 61 extends in the tire width direction from the inner end of the first sub groove 51 where the first sub groove 51 terminates within the center land portion 41 to the other first main groove 31 at an incline in a manner similar to that of the first sub groove 51. The second sipe 62 extends in the tire width direction from the inner end of the second sub groove 52 where the second sub groove 52 terminates within the center land portion 41 to the other first main groove 31 at an incline in a manner similar to that of the second sub groove 52. By the sipes 61, 62 and the sub groove 51, 52 being connected in this manner, the sub grooves 51, 52 can easily move when in contact with the ground, and snow that becomes lodged in the sub grooves 51, 52 is easily discharged.

The sub grooves 5 of the intermediate land portions 42 include a third sub groove 53 and a fourth sub groove 54. The third sub groove 53 extends outward in the tire width direction from the first main groove 31 to the second main groove 32 at an incline with respect to the tire circumferential direction. The fourth sub groove 54 extends inward in the tire width direction from the second main groove 32 at an incline with respect to the tire circumferential direction and terminates at a partway portion of the intermediate land portion 42. In the intermediate land portions 42, the third sub grooves 53 and fourth sub grooves 54 have the same inclination direction with respect to the tire circumferential direction and have the same inclination direction with respect to the tire circumferential direction as the first sub grooves 51 and the second sub grooves 52. The intermediate land portion 42 is divided into a plurality of portions in the tire circumferential direction by the third sub grooves 53 extending in the tire width direction and is defined into blocks by the first main groove 31, the second main groove 32, and the third sub grooves 53.

The sipes 6 of the intermediate land portions 42 include a third sipe 63 and a fourth sipe 64. The third sipe 63 extends in the tire width direction from the inner end of the fourth sub groove 54 where the fourth sub groove 54 terminates within the intermediate land portion 42 to the first main groove 31 at an incline in a manner similar to that of the fourth sub groove 54. The fourth sipe 64 extends as a single sipe in the tire circumferential direction and crosses the blocks of the intermediate land portions 42 in the tire circumferential direction. In the present embodiment, the fourth sipe 64 extends in the tire circumferential direction at the portions where the fourth sub grooves 54 and the third sipes 63 connect. By the third sipes 63 and the fourth sub grooves 54 being connected in this manner, the fourth sub grooves 54 can easily move when in contact with the ground, and snow that becomes lodged in the fourth sub grooves 54 is easily discharged. Furthermore, providing the fourth sipe 64 ensures edge components in the tire circumferential direction.

The sub grooves 5 of the shoulder land portions 43 include fifth sub grooves 55 and sixth sub grooves 56. The fifth sub groove 55 extends outward in the tire width direction from the second main groove 32 beyond a ground contact edge CE. The fifth sub groove 55 has the same inclination direction with respect to the tire circumferential direction as the first sub groove 51, the second sub groove 52, the third sub groove 53, and the fourth sub groove 54 from the second main groove 32 until just before the ground contact edge CE. The sixth sub groove 56 extends outward in the tire width direction from a partway portion of the shoulder land portions 43 inward of the ground contact edge CE in the tire width direction beyond the ground contact edge CE. The shoulder land portion 43 is divided into a plurality of portions in the tire circumferential direction by the fifth sub grooves 55 extending in the tire width direction and is defined into blocks by the second main groove 32 and the fifth sub grooves 55. The blocks of the shoulder land portions 43 are each provided with one sixth sub groove 56.

The sipes 6 of shoulder land portions 43 include fifth sipes 65 and sixth sipes 66. The fifth sipe 65 extends in the tire width direction from the second main groove 32 to the sixth sub groove 56. The fifth sipe 65 has the same inclination direction with respect to the tire circumferential direction as the first sub groove 51, the second sub groove 52, the third sub groove 53, the fourth sub groove 54, and the fifth sub groove 55. The sixth sipe 66 is disposed between the fifth sub groove 55, and the sixth sub groove 56 and fifth sipe 65, and extends in the tire width direction beyond the ground contact edge CE. The blocks of the shoulder land portions 43 are each provided with one sixth sipe 66 on either side of the sixth sub groove 56 in the tire circumferential direction. Additionally, the sixth sipe 66 has the same inclination direction as the fifth sipe 65 in the same range as the range in which the fifth sipe 65 inclines with respect to the tire circumferential direction. Beyond that range, the sixth sipe 66 extends outward in the tire width direction beyond the ground contact edge CE.

Here, "ground contact edge CE" refers to the two outermost edges of a ground contact region in the tire width direction. In FIG. 1, the ground contact edges CE are illustrated as being continuous in the tire circumferential direction. The ground contact region is the region where the tread surface 2a of the tread portion 2 of the pneumatic tire 1 comes into contact with a level road surface, when the pneumatic tire 1 is mounted on a regular rim, inflated to the regular internal pressure, and loaded with 70% of the regular load. The area that comes into contact with the road surface in the ground contact region is defined as the ground contact area. The dimension between the ground contact edges CE in the tire width direction is defined as the ground contact width D. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. "Regular load" refers a "maximum load capacity" defined by JATMA, the maximum value given in "TIRE LOAD LIMITS AT VARIOUS COLD INFLATION PRESSURES" defined by TRA, and a "LOAD CAPACITY" defined by ETRTO.

The land portions 4 (41, 42, 43) of the pneumatic tire 1 of the present embodiment have different groove area ratios, with the center land portion 41 and the intermediate land portions 42 having a lower groove area ratio than the groove area ratio of the shoulder land portions 43. In other words, the groove area ratio of the shoulder land portions 43 is higher than the groove area ratio of the center land portion 41 and the intermediate land portions 42. The sub grooves 5 (51, 52, 53, 54, 55, 56) and the sipes 6 (61, 62, 63, 64, 65, 66) are included in the calculation of the groove area ratios.

Here, "groove area ratio" is defined as: groove area/ (groove area+ground contact area). "Groove area" is defined as the opening area of the grooves in the ground contact surface, and here is the total opening area of the sub grooves 5 and the sipes 6. "Groove area+ground contact area" can be considered as the area of the land portions 4 without sub grooves 5 and sipes 6. Groove area is measured when the pneumatic tire 1 is mounted on a regular rim, inflated to the regular internal pressure, and in an unloaded state (regular load 0%).

Note that as illustrated in FIG. 1, in configurations in which the side surfaces of the center land portion 42 and shoulder land portions 43 that form the main grooves 3 are non-planar surfaces and the sub grooves 5 are formed at the borders of the recesses and protrusions, the area of the sub grooves 5 is defined as the area of the sub grooves 5 on the tread surface 2a demarcated by straight lines extending from the recessed side surface portions. Furthermore, the area of the sub grooves 5 in the shoulder land portions 43 is defined as the area of the sub grooves 5 in the region located inward from the ground contact edges CE in the tire width direction. The area of the sipes 6 in the shoulder land portions 43 is defined in a similar manner to the sub grooves 5 and is the area of the sipes 6 in the region inward from the ground contact edges CE in the tire width direction.

According to the pneumatic tire 1 of the present embodiment described above, by the groove area ratio of the shoulder land portions 43 being greater than the groove area ratio of the center land portion 41 and the intermediate land portions 42, edge components are increased. As a result, performance on snow (driving and braking performance) can be increased. The groove area ratio of the center land portion 41 has an effect on the steering stability performance when driving straight on dry road surfaces. Thus, by the center land portion 41 having a relatively low groove area ratio, the steering stability performance when driving straight on dry road surfaces can be improved. Additionally, the shoulder land portions 43 have an effect on the steering stability when cornering on dry road surfaces. Thus, by disposing the sub grooves 5 (55) so that the end portions of the sub grooves 5 (55) and the sub grooves 5 (53) of the intermediate land portions 42 do not align, the rigidity in the regions near the second main grooves 32 of the shoulder land portions 43 and the intermediate land portions 42 is improved. As a result, a decrease in the steering stability when cornering on dry road surfaces can be suppressed. As a result, performance on snow can be further improved while maintaining the steering stability performance on dry road surfaces.

Additionally, in the pneumatic tire 1 of the present embodiment, the shoulder land portion 43 includes a circumferential narrow groove 7 that extends in the tire circumferential direction in a manner that intersects the fifth sub grooves 55. The sixth sipes 66 are disposed outward of the circumferential narrow groove 7 in the tire width direction such that the two do not meet.

According to the pneumatic tire 1, the circumferential narrow grooves 7 improve the traction in the tire width direction when steering. As a result, the feedback when steering on snow-covered road surfaces is excellent and steering stability performance can be improved. By the circumferential narrow grooves 7 not meeting the sixth sipes 66, the rigidity of the shoulder land portions 43 is ensured. As a result, a decrease in the steering stability performance on dry road surfaces can be suppressed.

Note that the circumferential narrow groove 7 is similar to the sub groove 5 in that it is defined as a groove excluding the main groove 3 with a groove width greater than 1.0 mm and a groove depth at the deepest groove bottom less than that of the main groove 3.

In the pneumatic tire 1 of the present embodiment, the groove area ratios of the land portions 4 (41, 42, 43) to the sub grooves 5 (51, 52, 53, 54, 55, 56) are lower in the center land portion 41 and the intermediate land portions 42 and higher in the shoulder land portions 43.

According to such a pneumatic tire 1, the groove area ratio with respect to the sub grooves 5 (51, 52, 53, 54, 55, 56) is higher in the shoulder land portions 43 than in the center land portion 41 and the intermediate land portions 42. This allows the edge components to be increased beyond just those of the sipes 6 and performance on snow (driving and braking performance) to be improved.

A groove area ratio A of the center land portion 41 to the sub grooves 5 (51, 52), a groove area ratio B of the intermediate land portions 42 to the sub grooves 5 (53, 54), and a groove area ratio C of the shoulder land portions 43 to the sub grooves 5 (55, 56) have the following relationships: 1.1A≤C≤2.0A and 1.1B≤C≤2.0B.

If the groove area ratio C of the shoulder land portions 43 to the sub grooves 5 (55, 56) is less than 1.1A with respect to the groove area ratio A of the center land portion 41 to the sub grooves 5 (51, 52) and less than 1.1B with respect to the groove area ratio B of the intermediate land portions 42 to the sub grooves 5 (53, 54), the increase in edge components in the shoulder land portions 43 is minimal and performance on snow is not effectively improved. If the groove area ratio C of the shoulder land portions 43 to the sub grooves 5 (55, 56) is greater than 2.0A with respect to the groove area ratio A of the center land portion 41 to the sub grooves 5 (51, 52) and greater than 2.0B with respect to the groove area ratio B of the intermediate land portions 42 to the sub grooves 5 (53, 54), the rigidity in the shoulder land portions 43 is likely to decrease and the steering stability performance on dry road surfaces decreases significantly. Accordingly, the groove area ratios preferably have the relationships: 1.1A≤C≤2.0A and 1.1B≤C≤2.0B.

In the pneumatic tire 1 of the present embodiment, the first main grooves 31 are at least partially disposed within a range of from 0.05 D to 0.25 D outward from the tire equatorial plane CL in the tire width direction, D being the ground contact width. The second main grooves 32 are at least partially disposed within a range of from 0.40 D to 0.65 D outward from the tire equatorial plane CL in the tire width direction, D being the ground contact width. Note that the first main grooves 31 and the second main grooves 32 are only required to be at least partially disposed within the ranges described above, and the center of the groove width is preferably located within the ranges.

If the first main grooves 31 are located inward of the location of 0.05 D in the tire width direction, the width of the center land portion 41 is excessively narrow and the lateral rigidity decreases. As a result, the steering stability performance on dry road surfaces is likely to decrease. If the first main grooves 31 are located outward of the location of 0.25 D in the tire width direction, the intermediate land portions 42 are partially shifted outside of the positions that have a great effect on performance on snow. This is not preferable from the perspective of performance on snow. If the second main grooves 32 are located outward of the location of 0.65 D in the tire width direction, the width of the shoulder land portions 43 is excessively narrow and the lateral rigidity decreases. As a result, the steering stability performance on dry road surfaces is likely to decrease. If the second main grooves 32 are located inward of the location of 0.40 D in the tire width direction, the intermediate land portions 42 are partially shifted inside of the positions that have a great effect on performance on snow. This is not preferable from the perspective of performance on snow. Accordingly, the first main grooves 31 and the second main grooves 32 are preferably disposed as described above.

Figure 3:
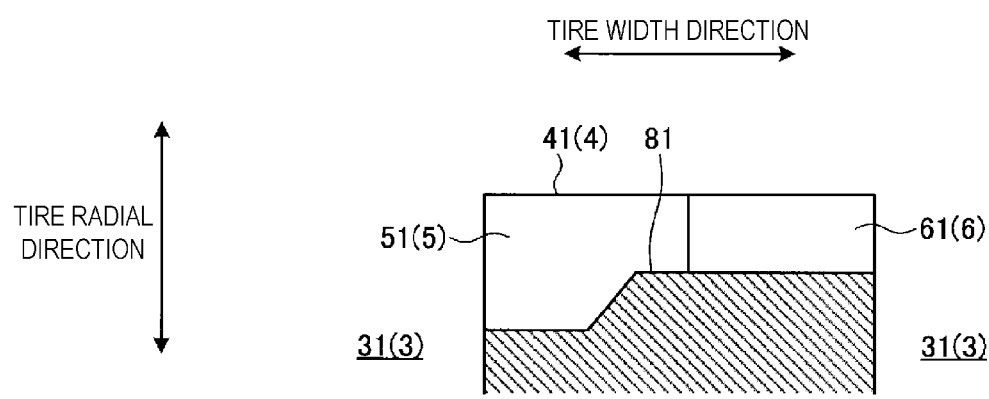
FIG. 3 is an enlarged plan view in the tire radial direction of a portion of the pneumatic tire according to the embodiment of the present technology.
Figure 4:
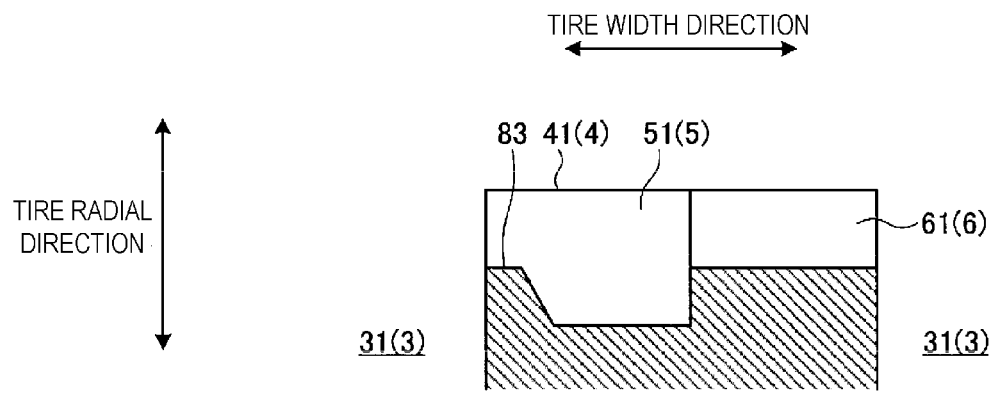
FIG. 4 is an enlarged plan view in the tire radial direction of a portion of the pneumatic tire according to the embodiment of the present technology.
Figure 5:
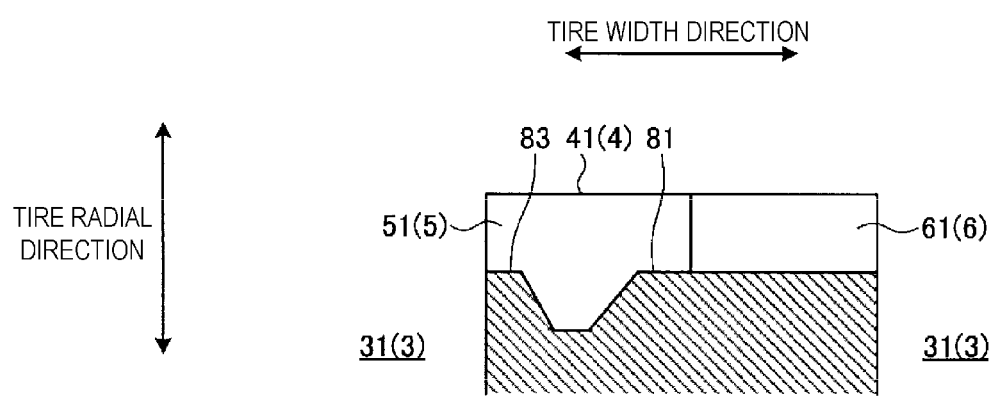
FIG. 5 is an enlarged plan view in the tire radial direction of a portion of the pneumatic tire according to the embodiment of the present technology.
Figure 6:
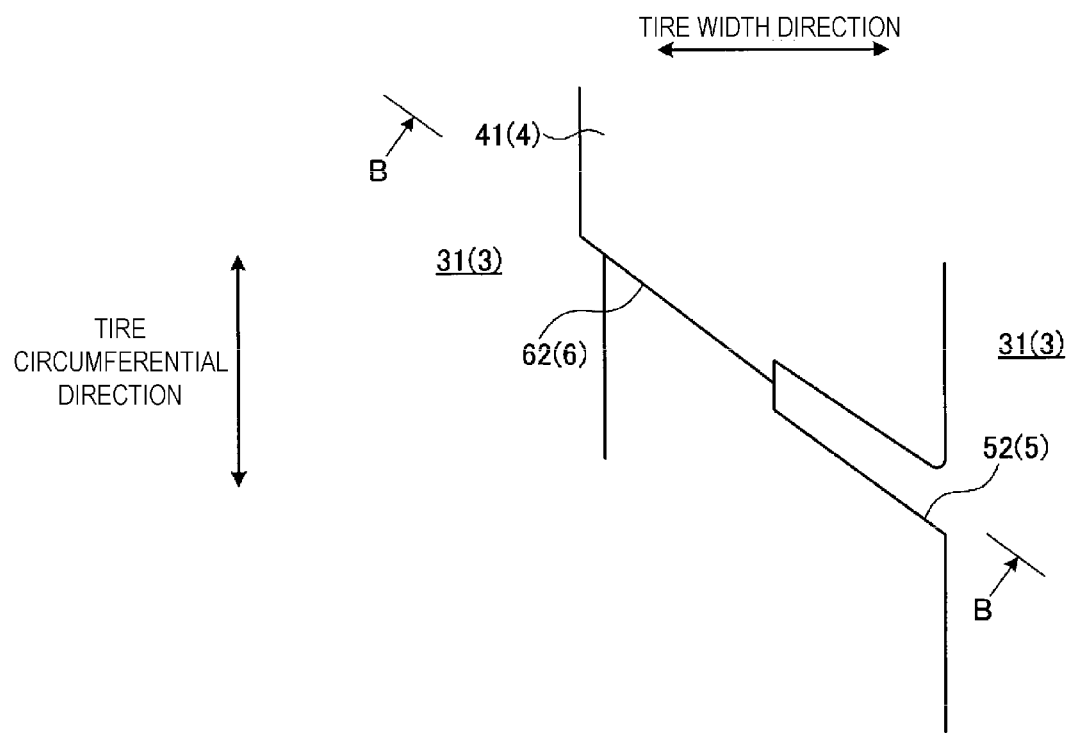
FIG. 6 is an enlarged plan view of a portion of the pneumatic tire according to the embodiment of the technology.
Figure 7:
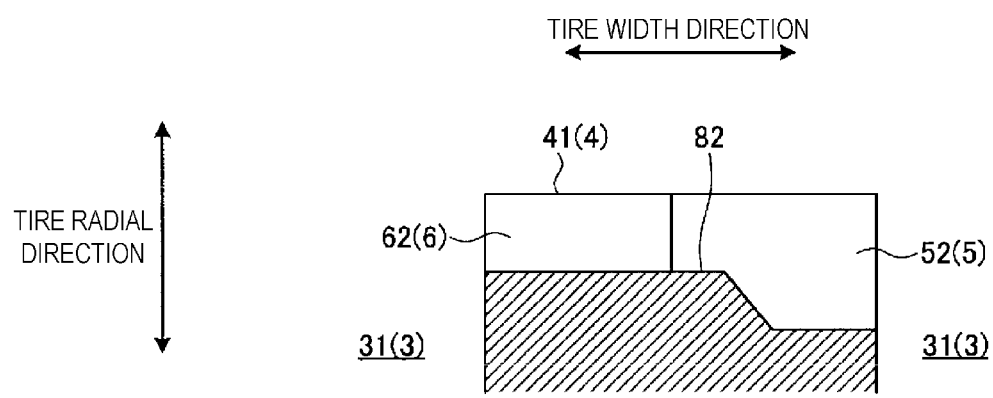
FIG. 7 is an enlarged plan view in the tire radial direction of a portion of the pneumatic tire according to the embodiment of the present technology.
Figure 8:
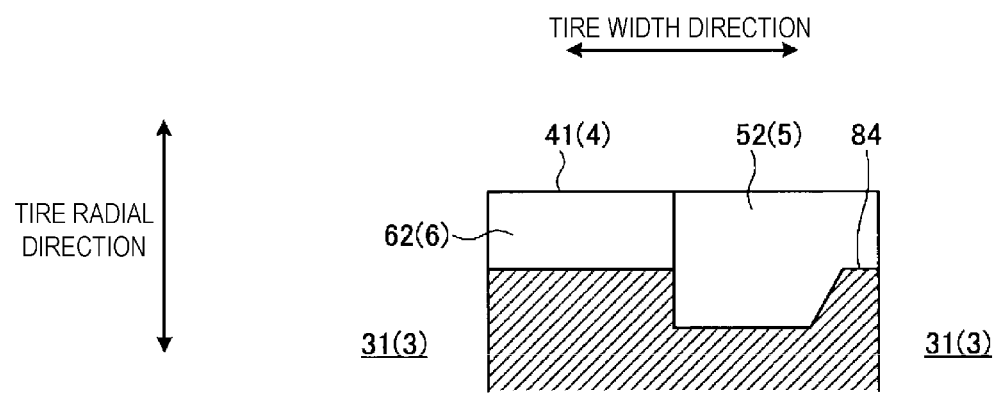
FIG. 8 is an enlarged plan view in the tire radial direction of a portion of the pneumatic tire according to the embodiment of the present technology.
Figure 9:
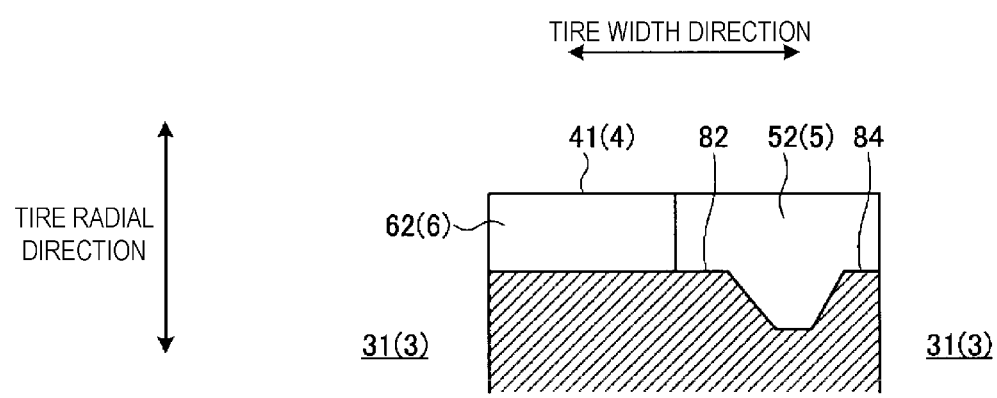
FIG. 9 is an enlarged plan view in the tire radial direction of a portion of the pneumatic tire according to the embodiment of the present technology.
Figure 10:
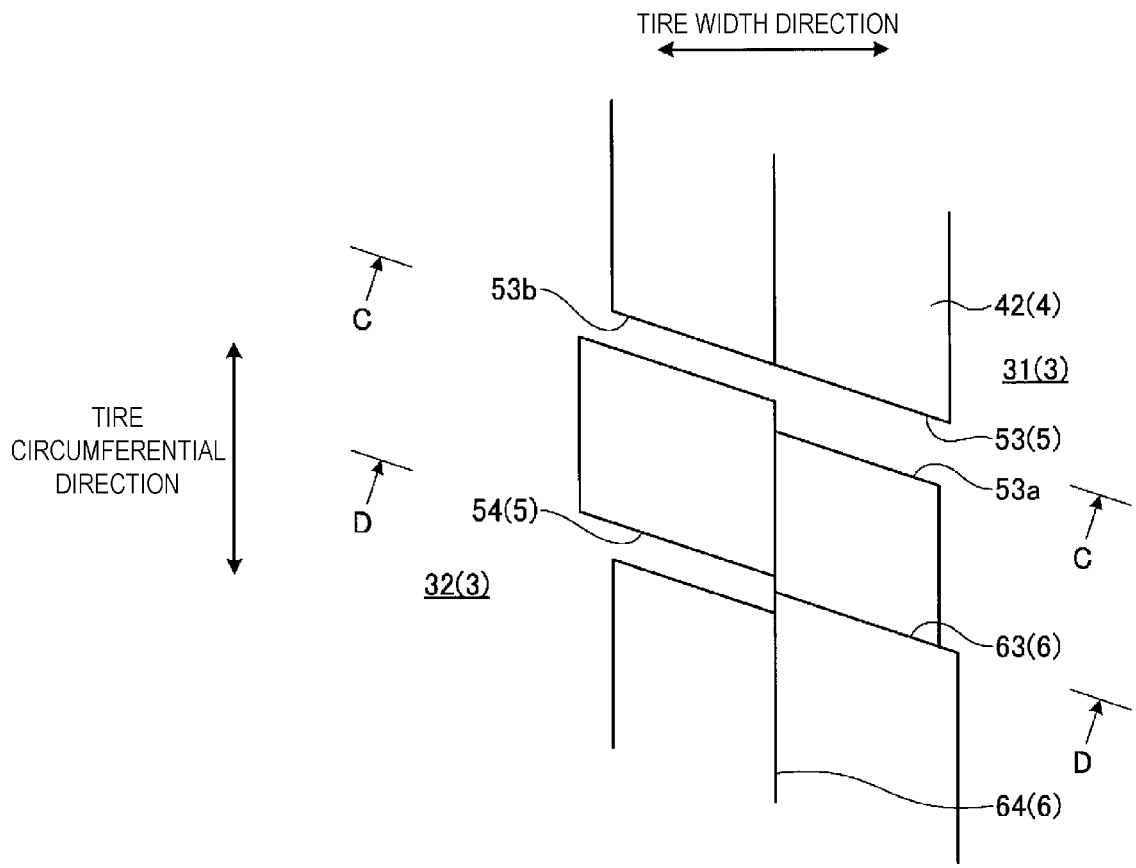
FIG. 10 is an enlarged plan view of a portion of the pneumatic tire according to the embodiment of the technology.
Figure 11:
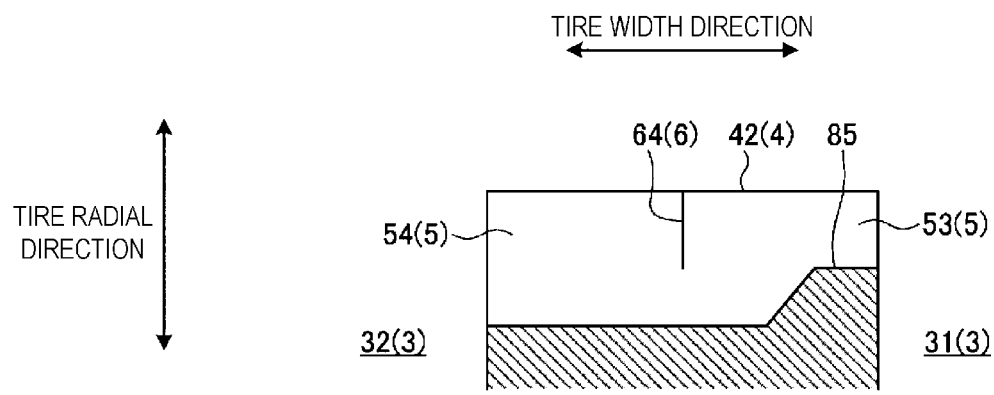
FIG. 11 is an enlarged plan view in the tire radial direction of a portion of the pneumatic tire according to the embodiment of the present technology.
Figure 12:
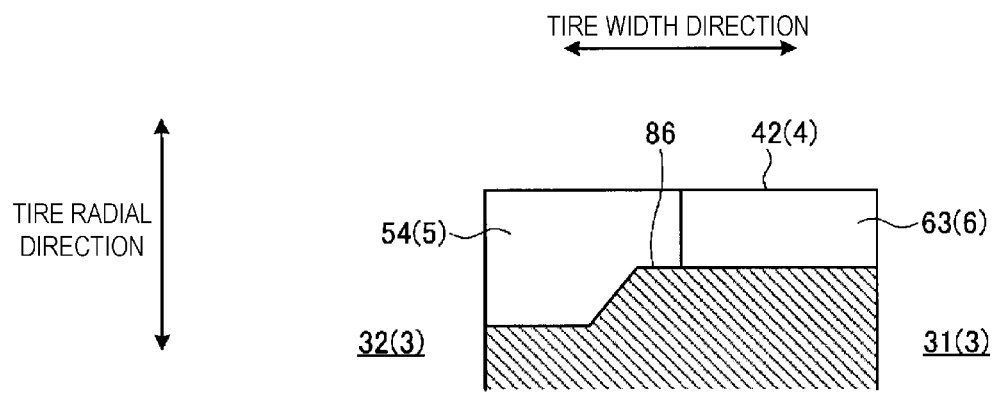
FIG. 12 is an enlarged plan view in the tire radial direction of a portion of the pneumatic tire according to the embodiment of the present technology.
Figure 13:
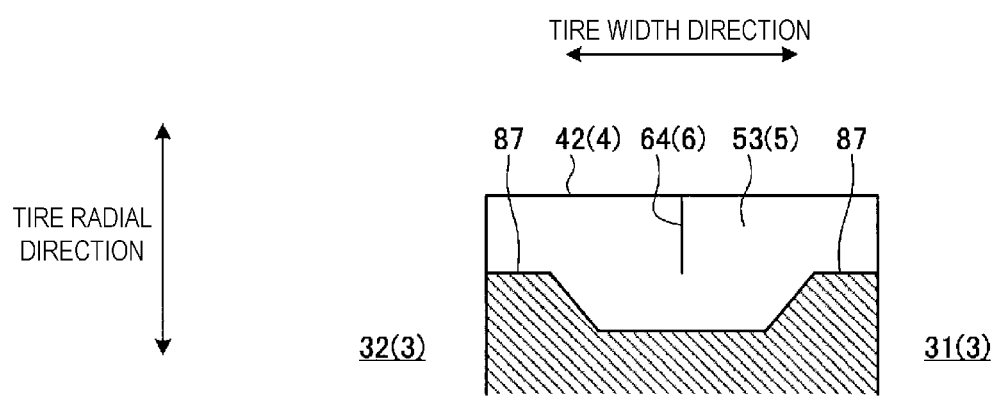
FIG. 13 is an enlarged plan view in the tire radial direction of a portion of the pneumatic tire according to the embodiment of the present technology.
Figure 14:
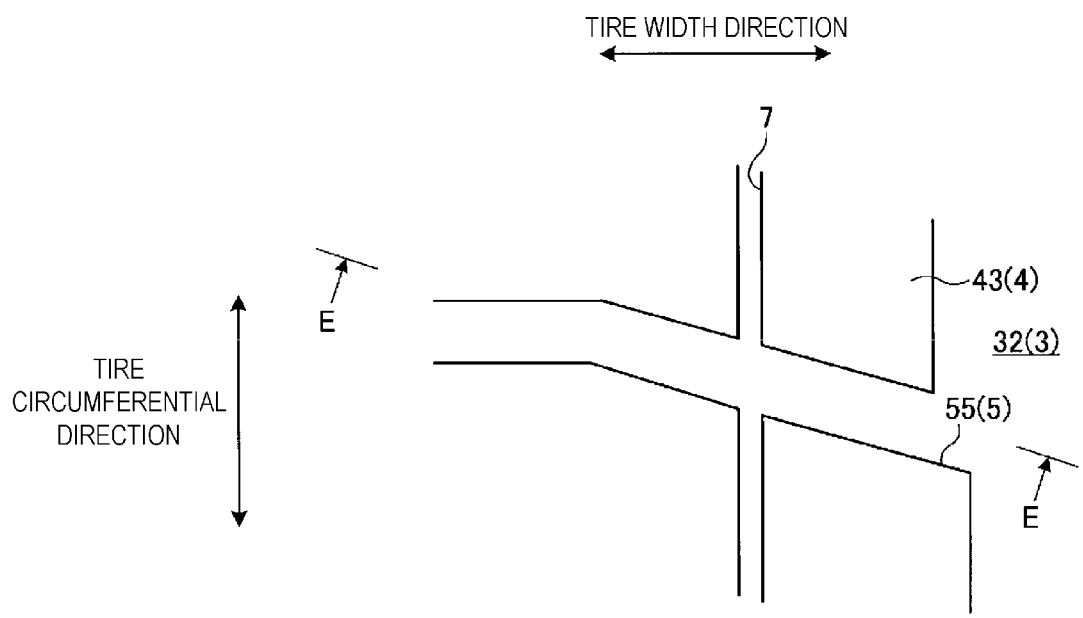
FIG. 14 is an enlarged plan view of a portion of the pneumatic tire according to the embodiment of the technology.
Figure 15:
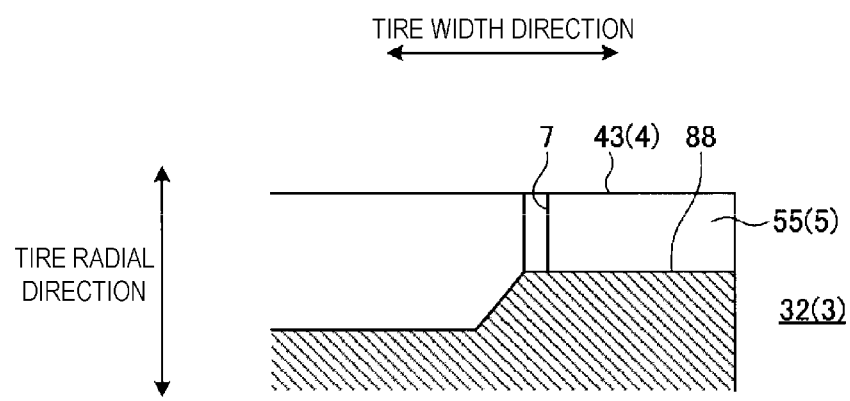
FIG. 15 is an enlarged plan view in the tire radial direction of a portion of the pneumatic tire according to the embodiment of the present technology.

FIG. 2 is an enlarged plan view of a portion (center land portion) of the pneumatic tire according to the present embodiment. FIG. 3 is an enlarged plan view in the tire radial direction of a portion of the pneumatic tire according to the present embodiment (cross-sectional view taken along A-A of FIG. 2). FIG. 4 is an enlarged plan view in the tire radial direction of a portion of the pneumatic tire according to the present embodiment (cross-sectional view taken along A-A of FIG. 2). FIG. 5 is an enlarged plan view in the tire radial direction of a portion of the pneumatic tire according to the present embodiment (cross-sectional view taken along A-A of FIG. 2). FIG. 6 is an enlarged plan view of a portion (center land portion) of the pneumatic tire according to the present embodiment. FIG. 7 is an enlarged plan view in the tire radial direction of a portion of the pneumatic tire according to the present embodiment (cross-sectional view taken along B-B of FIG. 6). FIG. 8 is an enlarged plan view in the tire radial direction of a portion of the pneumatic tire according to the present embodiment (cross-sectional view taken along B-B of FIG. 6). FIG. 9 is an enlarged plan view in the tire radial direction of a portion of the pneumatic tire according to the present embodiment (cross-sectional view taken along B-B of FIG. 6). FIG. 10 is an enlarged plan view of a portion (intermediate land portion) of the pneumatic tire according to the present embodiment. FIG. 11 is an enlarged plan view in the tire radial direction of a portion of the pneumatic tire according to the present embodiment (cross-sectional view taken along D-D of FIG. 10). FIG. 12 is an enlarged plan view in the tire radial direction of a portion of the pneumatic tire according to the present embodiment of the present technology (cross-sectional view taken along D-D of FIG. 10). FIG. 13 is an enlarged plan view in the tire radial direction of a portion of the pneumatic tire according to the present embodiment (cross-sectional view taken along C-C of FIG. 10). FIG. 14 is an enlarged plan view of a portion (shoulder land portion) of the pneumatic tire according to the present embodiment. FIG. 15 is an enlarged plan view in the tire radial direction of a portion of the pneumatic tire according to the present embodiment (cross-sectional view taken along E-E of FIG. 14).

As illustrated in FIG. 3, in the pneumatic tire 1 of the present embodiment, the first sub groove 51 may include a raised bottom portion 81 on the groove bottom at the inner end portion. As illustrated in FIGS. 6 and 7, the second sub groove 52 may include a raised bottom portion 82 on the groove bottom at the inner end portion.

According to the pneumatic tire 1, the raised bottom portions 81, 82 provided on the groove bottoms at the inner end portions of the first sub grooves 51 and the second sub grooves 52 connect the land portions on either side of the sub grooves 51, 52, and the raised bottom portions 81, 82 increase the rigidity of the center land portion 41 in the center region in the tire width direction. Thus, the effect of suppressing a decrease in the steering stability performance on dry road surfaces can be significantly obtained. Note that the raised bottom portions 81, 82 of the present embodiment are raised up to the groove bottom of the sipes 6, however in other embodiments, the raised bottom portions 81, 82 may be raised up to just before the groove bottom of the sipes 6.

Additionally, as illustrated in FIG. 4, in the pneumatic tire 1 of the present embodiment, the first sub groove 51 may include a raised bottom portion 83 on the groove bottom that extends to the first main groove 31. Additionally, as illustrated in FIGS. 6 and 8, the second sub groove 52 may include a raised bottom portion 84 on the groove bottom that extends to the first main groove 31.

According to the pneumatic tire 1, the raised bottom portions 83, 84 of the first sub grooves 51 and the second sub grooves 52 increase the rigidity of the center land portion 41 in the outer region in the tire width direction. Thus, the effect of suppressing a decrease in the steering stability performance on dry road surfaces can be significantly obtained.

Additionally, as illustrated in FIGS. 2 and 5, in the pneumatic tire 1 of the present embodiment, the first sub groove 51 may include the raised bottom portion 81 on the groove bottom at the inner end portion and the raised bottom portion 83 on the groove bottom that extends to the first main groove 31. Additionally, as illustrated in FIGS. 6 and 9, the second sub groove 52 may include the raised bottom portion 82 on the groove bottom at the inner end portion and the raised bottom portion 84 on the groove bottom that extends to the first main groove 31.

In such a configuration, the raised bottom portions 81, 82 increase the rigidity of the center land portion 41 in the center region in the tire width direction. As a result, the effect of suppressing a decrease in the steering stability performance on dry road surfaces can be significantly obtained. Additionally, the raised bottom portions 83, 84 increase the rigidity in the center land portion 41 in the outer region in the tire width direction. As a result, the effect of suppressing a decrease in the steering stability performance on dry road surfaces can be significantly obtained.

As illustrated in FIGS. 10 and 11, in the pneumatic tire 1 of the present embodiment, the third sub groove 53 may include a raised bottom portion 85 on the groove bottom at the end portion proximal to the first main groove 31. Additionally, as illustrated in FIGS. 10 and 12, the fourth sub groove 54 may include a raised bottom portion 86 on the groove bottom at the inner end portion.

According to the pneumatic tire 1, the raised bottom portions 85 provided in the third sub grooves 53 at the end portions proximal to the first main groove 31 increase the rigidity of the intermediate land portions 42 in the inner region in the tire width direction. Additionally, the raised bottom portions 86 provided in the fourth sub grooves 54 on the groove bottoms at the inner end portions increase rigidity in the intermediate land portions 42 in the center regions in the tire width direction. As a result, the effect of suppressing a decrease in the steering stability performance on dry road surfaces can be significantly obtained. Note that the raised bottom portion 86 may not extend to the first main groove 31. Note that the raised bottom portions 86 of the present embodiment are raised up to the groove bottom of the sipes 6, however in other embodiments, the raised bottom portions 86 may be raised up to just before the groove bottom of the sipes 6.

Additionally, as illustrated in FIGS. 10 and 13, in the pneumatic tire 1 of the present embodiment, the third sub groove 53 may include a raised bottom portion 87 on the groove bottom that extends to the first main groove 31 and a raised bottom portion 87 on the groove bottom that extends to the second main groove 32.

According to the pneumatic tire 1, the raised bottom portions 87 increase the rigidity of the intermediate land portions 42 on both sides in the tire width direction. Thus, the effect of suppressing a decrease in the steering stability performance on dry road surfaces can be significantly obtained.

Additionally, as illustrated in FIG. 10, in the pneumatic tire 1 of the present embodiment, the third sub groove 53 includes an inner sub groove portion 53a and an outer sub groove portion 53b. The inner sub groove portion 53a extends from the first main groove 31 to the partway portion of the intermediate land portion 42. The outer sub groove portion 53b communicates with the inner sub groove portion 53a and extends from the partway portion of the intermediate land portion 42 to the second main groove 32. The groove width of the outer sub groove portion 53b is less than the groove width of the inner sub groove portion 53a.

According to the pneumatic tire 1, by the groove width of the outer sub groove portion 53b proximal to the second main groove 32 being less than the groove width of the inner sub groove portion 53a, the rigidity of the intermediate land portion 42 in the outer region in the tire width direction is increased. Thus, the effect of suppressing a decrease in the steering stability performance on dry road surfaces can be significantly obtained.

As illustrated in FIGS. 14 and 15, in the pneumatic tire 1 of the present embodiment, the shoulder land portion 43 includes the circumferential narrow groove 7 that extends in the tire circumferential direction in a manner that intersects the fifth sub grooves 55, and the fifth sub grooves 55 include raised bottom portions 88 on the groove bottoms from the circumferential narrow groove 7 inward in the tire width direction.

According to the pneumatic tire 1, the raised bottom portions 88 increase the rigidity of the shoulder land portions 43 in the inner region in the tire width direction from the circumferential narrow groove 7. Thus, the effect of suppressing a decrease in the steering stability performance on dry road surfaces can be significantly obtained. Additionally, the raised bottom portions 88 prevent noise from escaping from the second main grooves 32 outward in the tire width direction from the circumferential narrow groove 7. As a result, external noise can be suppressed. Note that the raised bottom portions 88 of the present embodiment are provided in the entire region inward from the circumferential narrow groove 7 in the tire width direction. Alternatively, the raised bottom portions 88 may be partially provided.

Note that height from the groove bottom of the raised bottom portions 81, 82, 83, 84, 85, 86, 87, 88 described above preferably ranges from 25% to 75% of the depth of the sub groove 5 provided with the raised bottom portion 81, 82, 83, 84, 85, 86, 87, 88. If the height of the raised bottom portions 81, 82, 83, 84, 85, 86, 87, 88 is less than 25% of the depth of the sub groove 5, the effect of improving the rigidity provided by the raised bottom portions 81, 82, 83, 84, 85, 86, 87, 88 is unlikely to be obtained. If the height of the raised bottom portions 81, 82, 83, 84, 85, 86, 87, 88 is greater than 75% of the depth of the sub groove 5, the effect of improving performance on snow is minimized.

The range in which the raised bottom portions 81, 82, 83, 84, 85, 86, 87, 88 described above are disposed in the length direction of the sub groove 5 preferably ranges from 20% to 40% of the length of the sub groove 5 in the tire width direction. If the range of the raised bottom portions 81, 82, 83, 84, 85, 86, 87, 88 is less than 20% of the length of the sub groove 5, the effect of improving rigidity is unlikely to be obtained. If the range of the raised bottom portions 81, 82, 83, 84, 85, 86, 87, 88 is greater than 40% of the length of the sub groove 5, the effect of improving performance on snow is minimized.

The pneumatic tire of the present embodiment is preferably used as a pneumatic tire for passenger vehicles in particular. The total groove area ratio of the tread surface 2a to the main grooves 3, the sub grooves 5, and the sipes 6 can range from 30% to 45%.

Note that in the pneumatic tire 1 of the present embodiment, the sub grooves 5 and the sipes 6 have the same inclination direction in the ground contact width D. Accordingly, residual self-aligning torque (RSAT) can be obtained, which is self-aligning torque acting when the cornering force is zero, such that a vehicle drift in the straight forward direction is generated against a road cant.

EXAMPLES

In the examples, performance tests for performance on snow and steering stability performance on dry road surfaces were performed on a plurality of types of test tires under different conditions (see FIG. 16).

In these performance testing, pneumatic tires having a tire size of 215/50R17 were mounted on a regular rim, inflated to the regular internal pressure, and mounted on a test vehicle (2400 cc passenger vehicle).

Evaluation of performance on snow: the test vehicle was driven on a snow-covered road surface of a snowy road test site, and the driving performance and braking distance at a traveling speed of 40 km/h were measured. Then, the measurement results were expressed as index values with the result of the conventional example being defined as the reference (100). In this evaluation, larger values are preferable.

Evaluating of steering stability on the dry road surfaces: the test vehicle was driven on a dry road surface of a test course, and sensory evaluation was carried out by one experienced test driver for responsiveness (responsiveness when steering) when changing lanes and when cornering. The sensory evaluations were expressed as index values with the results of the pneumatic tire of the conventional example being defined as the reference (100). Larger index values indicate superior steering stability performance.

The pneumatic tires of the conventional example and examples shown in FIG. 16 include two first main grooves, two second main grooves, one center land portion, two intermediate land portions, and two shoulder land portions. Sub grooves and sipes are also provided in the land portions. The pneumatic tire of the conventional example is disclosed in Patent Document 1. The groove area ratio of the intermediate land portions is higher than the groove area ratios of the center land portion and the shoulder land portions. The pneumatic tires of Examples 1 to 8 include the sixth sipes and the groove area ratio of the shoulder land portions is higher than the groove area ratios of the center land portion and the intermediate land portions. The pneumatic tires according to Examples 4 to 8 include the circumferential narrow grooves. The pneumatic tires of Examples 7 and 8 include the raised bottom portions.

As shown in the test results in FIG. 16, it can be seen that the pneumatic tires according to Examples 1 to 8 have enhanced performance on snow while maintaining the steering stability performance on dry road surfaces.

The invention claimed is:

1. A pneumatic tire, comprising:
a first main groove disposed in a tread surface on either side of a tire equatorial plane, the first main grooves extending in a tire circumferential direction;
a second main groove disposed outward of each of the first main grooves in a tire width direction, the second main groove extending in the tire circumferential direction;
five land portions defined by the first and second main grooves, the five land portions including a center land portion located between the first main grooves, two intermediate land portions located between the first main grooves and the second main grooves, and two shoulder land portions located outward of the second main grooves in the tire width direction; and
sub grooves and sipes disposed in each of the land portions;
the land portions having different groove area ratios to the sub grooves and the sipes, with the shoulder land portions having a higher groove area ratio than the center land portion and the intermediate land portions;
the sub grooves disposed in the center land portion including first sub grooves extending in the tire width direction from one of the first main grooves to a partway portion of the center land portion, and second sub grooves extending in the tire width direction from an other first main groove to the partway portion of the center land portion, the first sub grooves and the second sub grooves being alternately disposed in the tire circumferential direction at predetermined intervals, and the center land portion being formed as a rib, and
the sipes disposed in the center land portion including first sipes extending in the tire width direction from an inner end of the first sub groove to the other first main groove, and second sipes extending in the tire width direction from an inner end of the second sub groove to the one of the first main grooves;
the sub grooves disposed in the intermediate land portions including third sub grooves extending in the tire width direction from the first main groove to the second main groove, and fourth sub grooves extending in the tire width direction from the second main groove to a partway portion of the intermediate land portion, the third sub grooves being disposed in the tire circumferential direction at predetermined intervals, and the intermediate land portions being defined into blocks by the first main groove, the second main groove, and the third sub grooves, and
the blocks each being provided with one of the fourth sub grooves, and
the sipes disposed in the intermediate land portions including third sipes extending in the tire width direction from an inner end of the fourth sub groove to the first main groove, and a fourth sipe that crosses the blocks in the tire circumferential direction;
the sub grooves disposed in the shoulder land portions including fifth sub grooves extending outward in the tire width direction from the second main groove beyond a ground contact edge, the fifth sub grooves being disposed so that an end portion thereof proximal to the second main groove does not align with an end portion of the third sub groove of the intermediate land portion proximal to the second main groove, and sixth sub grooves extending outward in the tire width direction from a partway portion of the shoulder land portion beyond the ground contact edge, and
the fifth sub grooves being disposed in the tire circumferential direction at predetermined intervals, and the shoulder land portions being defined into blocks by the second main groove and the fifth sub grooves, and the blocks each being provided with one of the sixth sub grooves, and
the sipes disposed in the shoulder land portions including fifth sipes extending in the tire width direction from the second main groove to the sixth sub groove and sixth sipes extending in the tire width direction between the fifth sub groove and the sixth sub groove and the fifth sipe beyond the ground contact edge, wherein the sixth sipes terminate at both ends in the shoulder land portions without opening to a groove.

2. The pneumatic tire according to claim 1, wherein the groove area ratios of the land portions to the sub grooves are such that the groove area ratio is higher in the shoulder land portions than in the center land portion and the intermediate land portions.

3. The pneumatic tire according to claim 1, wherein a groove area ratio A of the center land portion to the sub grooves, a groove area ratio B of the intermediate land portions to the sub grooves, and a groove area ratio C of the shoulder land portions to the sub grooves have relationships: $1.1A \leq C \leq 2.0A$ and $1.1B \leq C \leq 2.0B$.

4. The pneumatic tire according to claim 1, wherein the first main grooves are at least partially disposed within a range of from 0.05D to 0.25D outward from a tire equatorial plane in the tire width direction, and the second main grooves are at least partially disposed within a range of from 0.40D to 0.65D outward from the tire equatorial plane in the tire width direction, D being a ground contact width.

5. The pneumatic tire according to claim 1, wherein the first sub grooves and the second sub grooves are provided with a raised bottom portion on a groove bottom at an inner end portion.

6. The pneumatic tire according to claim 1, wherein the first sub grooves and the second sub grooves are provided with a raised bottom portion on a groove bottom extending to the first main groove.

7. The pneumatic tire according to claim 1, wherein the third sub grooves are provided with a raised bottom portion on a groove bottom at an end portion proximal to the first main groove, and the fourth sub grooves are provided with a raised bottom portion on a groove bottom at an inner end portion.

8. The pneumatic tire according to claim 1, wherein the third sub groove is provided with a raised bottom portion on a groove bottom extending to the first main groove and a raised bottom portion extending to the second main groove.

9. The pneumatic tire according to claim 1, wherein the third sub grooves include an inner sub groove portion extending from the first main groove to the partway portion of the intermediate land portion and an outer sub groove portion that communicates with the inner sub groove portion and extends from the partway portion of the intermediate land portion to the second main groove, and the outer sub groove portion has a smaller groove width than the inner sub groove portion.

10. The pneumatic tire according to claim 1, wherein the shoulder land portions are provided with a circumferential narrow groove that extends in the tire circumferential direction and intersects the fifth sub grooves, and the fifth sub grooves are provided with a raised bottom portion on a groove bottom inward of the circumferential narrow groove in the tire width direction.

11. The pneumatic tire according to claim 1, wherein at least a portion of the fifth sub grooves, the fifth sipes and the sixth sipes between the second main groove and the ground contact edge in the shoulder land portions share the same inclination direction with respect to the tire circumferential direction as the sub grooves and sipes in each of the center and intermediate land portions.

12. The pneumatic tire according to claim 1, wherein at least the fourth sipe has a groove width of from 0.5 mm to less than 1.0 mm and has a depth of less than a depth of the sub grooves.

13. The pneumatic tire according to claim 1, wherein the shoulder land portions include a circumferential narrow groove extending in the tire circumferential direction that intersects the fifth sub grooves, and the sixth sipes are disposed outward of the circumferential narrow groove in the tire width direction without meeting the circumferential narrow groove.

14. The pneumatic tire according to claim 13, wherein the groove area ratios of the land portions to the sub grooves are such that the groove area ratio is higher in the shoulder land portions than in the center land portion and the intermediate land portions.

15. The pneumatic tire according to claim 14, wherein a groove area ratio A of the center land portion to the sub grooves, a groove area ratio B of the intermediate land portions to the sub grooves, and a groove area ratio C of the shoulder land portions to the sub grooves have relationships: $1.1A \leq C \leq 2.0A$ and $1.1B \leq C \leq 2.0B$.

16. The pneumatic tire according to claim 15, wherein the first main grooves are at least partially disposed within a range of from 0.05D to 0.25D outward from a tire equatorial plane in the tire width direction, and the second main grooves are at least partially disposed within a range of from 0.40D to 0.65D outward from the tire equatorial plane in the tire width direction, D being a ground contact width.

17. The pneumatic tire according to claim 16, wherein the first sub grooves and the second sub grooves are provided with a raised bottom portion on a groove bottom at an inner end portion.

18. The pneumatic tire according to claim 16, wherein the first sub grooves and the second sub grooves are provided with a raised bottom portion on a groove bottom extending to the first main groove.

19. The pneumatic tire according to claim 18, wherein the third sub grooves are provided with a raised bottom portion on a groove bottom at an end portion proximal to the first main groove, and the fourth sub grooves are provided with a raised bottom portion on a groove bottom at an inner end portion.

* * * * *